(No Model.)

J. & H. MONKS.
SPROCKET CHAIN AND WHEEL.

No. 564,830. Patented July 28, 1896.

WITNESSES:

INVENTORS
J. & H. Monks
BY Munn & Co
ATTORNEYS.

UNITED STATES PATENT OFFICE.

JAMES MONKS AND HERBERT MONKS, OF HARTFORD, CONNECTICUT.

SPROCKET-CHAIN AND WHEEL.

SPECIFICATION forming part of Letters Patent No. 564,830, dated July 28, 1896.

Application filed November 11, 1895. Serial No. 568,525. (No model.)

*To all whom it may concern:*

Be it known that we, JAMES MONKS and HERBERT MONKS, of Hartford, in the county of Hartford and State of Connecticut, have invented a new and useful Improvement in Sprocket-Chains and Wheels Therefor, of which the following is a full, clear, and exact description.

Our invention relates to an improvement in sprocket-chains and wheels therefor, and especially to an improvement in the chains and sprockets for bicycles and like machines; and the object of the invention is to provide a sprocket-chain and sprocket-wheel so constructed that both will move with a minimum of friction, and whereby the chain will at the same time be made to move firmly on the sprocket-wheel.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
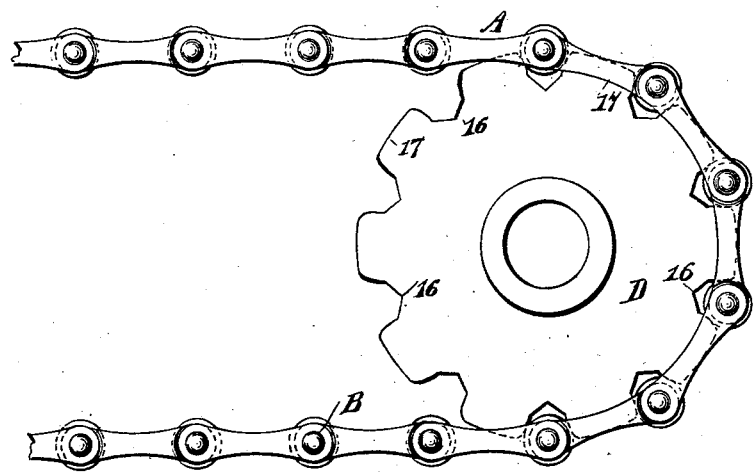
Figure 2:
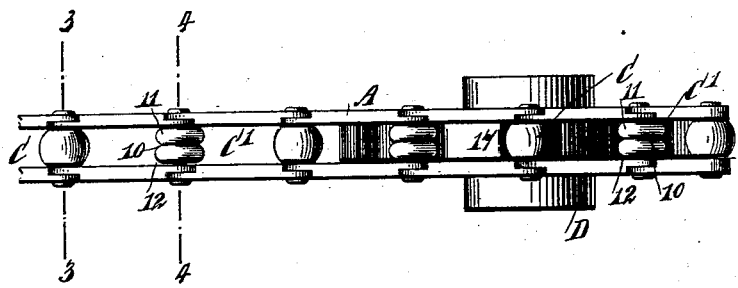
Figure 3:
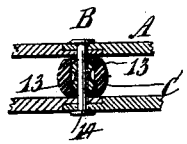
Figure 4:
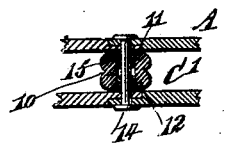

Figure 1 is a side elevation of the improved sprocket and chain. Fig. 2 is a plan view of the same. Fig. 3 is a section through the chain, taken substantially on the line 3 3 of Fig. 2; and Fig. 4 is a section taken through the chain on the line 4 4 of Fig. 2.

In constructing a chain after the manner of our invention a series of links A, duplicates in size and formation, are pivotally connected with each other in the usual manner by means of pivots B. Carried on each pivot and between the ends of each pair of links A are a series of bearings C and C', said bearings being of different and hereinafter-described forms and being alternately arranged on the chains.

The bearings C are shaped substantially spherical and have their transverse extremities cut off, so as to form plane surfaces conforming to the corresponding shape of the links A. The bearings C' have plane ends also conforming to the links A and have intermediate of their ends two concentric ribs 11 and 12, the same having rounded bearing-surfaces and having the same size and relation to the bearing on which they are formed.

Such a chain is adapted for use with a sprocket-wheel the face and the teeth of which have plane transverse surfaces, so that the bearing C will make contact at one point only and will roll on the face of the sprocket-wheel with a minimum degree of friction. At the same time the bearings C' will make contact at two points and will roll on the face of the sprocket-wheel with a degree of friction equal to its increased contact.

It will also be seen that the bearing C, having a single point of contact at the middle of a curved surface, will have a tendency to roll or wabble on the face of the sprocket, thereby tending to destroy the firm and steady operation of the chain on the wheel, which will make the links A have irregular contact with the sides of the teeth on the sprocket-wheel and thereby materially retard the effective operation of the chain. The purpose of the bearings C' is to overcome this deleterious tendency of the bearing C, which object is attained by the two-point contact that the bearing C' has with the face of the sprocket-wheel, and it will be seen that this bearing having two points of contact, each of which points revolves around a common axis, will not be attended by an inclination to wabble, but will roll firmly and steadily on the sprocket-wheel. Thus the tendency to roll which characterizes the bearings C is prevented.

Reference to the drawings will show that the single point of contact on the bearings C and the double contact on the bearing C' of each adjacent pair of bearings will form a triangle, the angles of which being rigidly connected by the respective links A', will therefore be steadily seated on the face of the wheel and assist in preventing the wabbling of the chain.

The chain is provided with alternating bearings, as above described, to the end that the increased friction occasioned by the bearings C' will not extend throughout all the bearings in the chain, since the steadying influence produced by the number of bearings C' that is shown is sufficient to hold the bearings C, while the absence of bearings C' is productive of a reduction in the friction produced by the operation of the chain.

In order that the roller-bearings may turn in the chain with the least possible amount of friction, the pivot preferably consists of a sleeve 13, having a concaved central portion, whereby it engages with the ball-bearing, into which it is introduced at its ends only, and a pivot-pin 14 is passed, preferably, tightly through the said sleeve and through the abutting ends of the links of the chain, being suitably headed at its extremities; but if in practice it is found desirable the pin 14 may be provided with a collar 15 near each of its ends, as shown in Fig. 4, instead of the said sleeve 13, the collars having engagement with the roller-bearings and the pin being out of engagement therewith.

The sprocket-wheel D is provided with a series of substantially U-shaped recesses 16 in its periphery, and said recesses lie transversely of the wheel and are placed at such a distance apart as to receive within them the bearings as the chain passes around the wheel, as illustrated in Figs. 1 and 2. In the detail formation of the recesses their side walls diverge from the bottom outward, and the upper portions of these walls are convex, forming rounded contact-surfaces for the bearings, thus giving them a free, easy, rolling motion. It is essential, however, as above explained, that the sprockets have surfaces plane in a transverse line, so that the bearings may have the necessary coöperation therewith.

Having thus described our invention, we claim as new and desire to secure by Letters Patent—

1. In a sprocket-chain, the combination, with the links and their pivots, of a roller having a depressed central portion, whereby bearing-surfaces are provided at the end portions of the roller only, as and for the purpose set forth.

2. In a sprocket-chain, the combination of a series of links pivotally connected and two sets of bearings located between the links, the bearings of one set having a single point of contact with the sprocket-wheel, and the bearings of the remaining set having a double point of contact, substantially as described.

3. In a sprocket-wheel, the combination of a series of links, pivots loosely connecting said links and a bearing carried by each pivot, a portion of said bearings having regularly-curved bearing-surfaces whereby a single contact-point is formed and a second portion of the bearings having each two ribs each adapted to form a contact-point, substantially as described.

JAMES MONKS.
HERBERT MONKS.

Witnesses:
WM. MONKS,
FRANK W. SHACKLY.